(12) United States Patent
Yin (10) Patent No.: US 12,250,144 B2
(45) Date of Patent: Mar. 11, 2025

(54) PATH PLANNING METHOD AND APPARATUS, AND DATA TRANSMISSION SYSTEM

(71) Applicant: HUAWEI TECHNOLOGIES CO., LTD., Guangdong (CN)

(72) Inventor: Mingliang Yin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 387 days.

(21) Appl. No.: 17/741,106

(22) Filed: May 10, 2022

(65) Prior Publication Data
US 2022/0272030 A1    Aug. 25, 2022

Related U.S. Application Data (63) Continuation of application No. PCT/CN2020/118226, filed on Sep. 28, 2020.

(30) Foreign Application Priority Data

Nov. 15, 2019 (CN) .......................... 201911119744.4

(51) Int. Cl.
*H04L 45/302* (2022.01)
*H04L 45/02* (2022.01)
(52) U.S. Cl.
CPC ............ *H04L 45/302* (2013.01); *H04L 45/02* (2013.01)
(58) Field of Classification Search
CPC ......... H04L 45/30; H04L 45/02; H04L 45/12; H04L 45/34; H04L 45/42
See application file for complete search history.

(56) References Cited

U.S. PATENT DOCUMENTS

| | | | |
|---|---|---|---|
| 2017/0099211 A1 | 4/2017 | Iovanna et al. | |
| 2017/0346720 A1* | 11/2017 | Lazzeri | .................. H04L 45/20 |
| 2018/0131616 A1 | 5/2018 | Laberge et al. | |

FOREIGN PATENT DOCUMENTS

| | | |
|---|---|---|
| CN | 106416157 A | 2/2017 |
| CN | 106982238 A | 7/2017 |
| CN | 109936516 A | 6/2019 |
| WO | 2016102008 A1 | 6/2016 |

OTHER PUBLICATIONS

Extended European Search Report in European Appln No. 20888015.3, dated Nov. 23, 2022, 7 pages.
International Search Report and Written Opinion in International Appln. No. PCT/CN2020/118226, mailed on Dec. 11, 2020, 16 pages (with English translation).

* cited by examiner

*Primary Examiner* — Ayanah S George
(74) *Attorney, Agent, or Firm* — Fish & Richardson P.C.

(57) ABSTRACT

An example method includes: determining a transmission parameter condition of a to-be-planned path between a head node and a tail node of a flow; searching for a target virtual path whose transmission parameter meets the transmission parameter condition in at least one virtual path between the head node and the tail node, where a transmission parameter of the virtual path is a transmission parameter of a physical path corresponding to the virtual path, and each node on the virtual path is located on the corresponding physical path; and sending path planning information to the head node, where the path planning information is used to indicate labels and a sequence of nodes on the target virtual path.

20 Claims, 4 Drawing Sheets

PATH PLANNING METHOD AND APPARATUS, AND DATA TRANSMISSION SYSTEM

CROSS-REFERENCE TO RELATED APPLICATIONS

This application is a continuation of International Application No. PCT/CN2020/118226, filed on Sep. 28, 2020, which claims priority to Chinese Patent Application No. 201911119744.4, filed on Nov. 15, 2019. The disclosures of the aforementioned applications are hereby incorporated by reference in their entireties.

TECHNICAL FIELD

This application relates to the field of communication technologies, and in particular, to a path planning method and apparatus, and a data transmission system.

BACKGROUND

SRv6 is a network forwarding technology applicable to Internet Protocol version 6 (IPv6), and SR is referred to as segment routing.

In SRv6, a controller may usually plan a path for a plurality of nodes based on a physical path between the plurality of nodes, and deliver information (such as labels and a sequence) of the nodes on the planned path to a head node in the plurality of nodes. After receiving to-be-forwarded data sent by a terminal, the head node encapsulates the to-be-forwarded data into a data packet based on the information of the nodes on the path delivered by the controller. The data packet includes a segment routing protocol header (SRH) that carries the information of the nodes on the path, and a payload part that carries the to-be-forwarded data.

Currently, however, there are few alternative manners of planning a path by the controller.

SUMMARY

This application provides a path planning method and apparatus, and a data transmission system, which can resolve a problem that there are few alternative manners of planning a path by a controller. Technical solutions are as follows.

According to a first aspect, a path planning method is provided. The method includes: determining a transmission parameter condition of a to-be-planned path between a head node and a tail node of a flow; searching for a target virtual path whose transmission parameter meets the transmission parameter condition in at least one virtual path between the head node and the tail node, where a transmission parameter of the virtual path is a transmission parameter of a physical path corresponding to the virtual path, and each node on the virtual path is located on the corresponding physical path; and sending path planning information to the head node, where the path planning information is used to indicate labels and a sequence of nodes on the target virtual path.

In the path planning method, a controller may search, based on the transmission parameter condition, for the target virtual path whose transmission parameter meets the transmission parameter condition in the at least one virtual path between the head node and the tail node. Then, the controller sends the path planning information used to indicate the labels and the sequence of the nodes on the target virtual path to the head node. It can be learned that this embodiment of this application provides a brand new path planning method, thereby enriching path planning manners.

Optionally, the target virtual path is a virtual path with a smallest quantity of nodes in a virtual path whose transmission parameter meets the transmission parameter condition in the at least one virtual path. It can be learned that the target virtual path that is searched for by a path planning apparatus is the path with the smallest quantity of nodes in the virtual path that meets the transmission parameter condition in the at least one virtual path. In this case, a quantity of labels of nodes that need to be carried in an SRH is relatively small. Therefore, the SRH is relatively short, and a load proportion of a data packet in which the SRH is located is relatively large, and a load rate of the data packet is increased.

Optionally, the searching for a target virtual path whose transmission parameter meets the transmission parameter condition in at least one virtual path between the head node and the tail node includes: sequentially detecting, in ascending order of a quantity of nodes on the virtual path, whether a virtual path whose transmission parameter meets the transmission parameter condition exists in the at least one virtual path; and when that the virtual path whose transmission parameter meets the transmission parameter condition exists in the at least one virtual path is detected, determining the virtual path whose transmission parameter meets the transmission parameter condition as the target virtual path. It can be learned that, to accelerate in finding the target virtual path, and ensure that the target virtual path that is searched for is the path with the smallest quantity of nodes in the at least one virtual path, the controller may sequentially detect, in ascending order of a quantity of nodes on a virtual path, whether the virtual path whose transmission parameter meets the transmission parameter condition exists in the at least one virtual path. For example, the controller may first sequentially detect whether a transmission parameter of a virtual path including i (i≥2) nodes meets the transmission parameter condition. If it is detected that a transmission parameter of a specific virtual path including i nodes meets the transmission parameter condition, the controller may directly determine the virtual path as the target virtual path. If transmission parameters of all virtual paths that include i nodes do not meet the transmission parameter condition, the controller needs to further detect whether a transmission parameter of a virtual path that includes i+1 nodes meets the transmission parameter condition, until the controller finds a virtual path whose transmission parameter meets the transmission parameter condition.

It should be noted that, in this application, that the controller sequentially detects, in ascending order of a quantity of nodes on the virtual path, whether the virtual path whose transmission parameter meets the transmission parameter condition exists in the at least one virtual path is used as an example. Optionally, the controller may first find a part of virtual paths whose transmission parameters meet the transmission parameter condition in the at least one virtual path, and then determine a path with a smallest quantity of nodes on the part of virtual paths as the target virtual path. This is not limited in this embodiment of this application. For example, the transmission parameter is a delay, and the transmission parameter condition is that a delay is less than 30 seconds. It is assumed that the part of virtual paths in the at least one virtual path include a virtual path x (node 1-node 5-node 4-node 3) whose delay is 25 seconds and a virtual path y (node 1-node 2-node 3) whose delay is 28 seconds. In this case, the controller may determine the virtual path y as the target virtual path.

Optionally, the virtual path includes at least one directly connected virtual subpath, and the physical path corresponding to the virtual path includes at least one physical subpath, where the at least one directly connected virtual subpath is in a one-to-one correspondence with the at least one physical subpath, and a physical subpath corresponding to a directly connected virtual subpath is an interior gateway protocol IGP physical subpath between two nodes directly connected through the directly connected virtual subpath. It should be noted that, in this embodiment of this application, that the virtual path is determined based on the directly connected virtual subpath is used as an example. Certainly, the virtual path may not be determined based on the directly connected virtual subpath. For example, the virtual path may include at least one virtual subpath, and all of the at least one virtual subpath may not be a directly connected virtual subpath, or a part of the at least one virtual subpath may be a directly connected virtual subpath and the other part of the at least one virtual subpath may not be a directly connected virtual subpath.

Optionally, before the determining a transmission parameter condition of a to-be-planned path between a head node and a tail node of a flow, the method further includes: obtaining a transmission parameter of a directly connected virtual subpath between any two nodes in a plurality of nodes; and the searching for a target virtual path whose transmission parameter meets the transmission parameter condition in at least one virtual path between the head node and the tail node includes: determining a transmission parameter of each directly connected virtual subpath of the at least one virtual path based on the transmission parameter of the directly connected virtual subpath between any two nodes in the plurality of nodes; determining a transmission parameter of each virtual path based on a transmission parameter of a directly connected virtual subpath of each virtual path in the at least one virtual path; and searching for the target virtual path in the at least one virtual path based on a transmission parameter of the at least one virtual path. In this embodiment of this application, that the controller obtains the transmission parameter of the directly connected virtual subpath in advance before path planning is used as an example. Certainly, the transmission parameter of the directly connected virtual subpath may also be obtained only during path planning. This is not limited in this embodiment of this application.

Optionally, before the obtaining a transmission parameter of a directly connected virtual subpath between any two nodes in a plurality of nodes, the method further includes: establishing a virtual topology of the plurality of nodes based on the transmission parameter of the directly connected virtual subpath between any two nodes in the plurality of nodes, where the virtual topology includes the plurality of nodes, the directly connected virtual subpath between any two nodes in the plurality of nodes, and the transmission parameter of the directly connected virtual subpath; and the determining a transmission parameter of each directly connected virtual subpath of the at least one virtual path based on the transmission parameter of the directly connected virtual subpath between any two nodes in the plurality of nodes includes: determining the transmission parameter of each directly connected virtual subpath of the at least one virtual path based on the virtual topology.

Optionally, the path planning information is further used to indicate an identifier of the target virtual path.

Optionally, the transmission parameter includes a service level agreement SLA parameter.

According to a second aspect, a path planning apparatus is provided. The path planning apparatus includes modules configured to implement the path planning method provided in the first aspect.

According to a third aspect, a path planning apparatus is provided. The path planning apparatus includes a processor and a memory, where the memory stores a program, and the processor is configured to execute the program stored in the memory to implement the path planning method according to the first aspect.

According to a fourth aspect, a computer storage medium is provided. The storage medium stores a computer program. When the computer program is executed by a processor, the path planning method according to the first aspect is implemented.

According to a fifth aspect, a computer program product including instructions is provided. When the computer program product is run on a computer, the computer is enabled to perform the path planning method according to the first aspect.

According to a sixth aspect, a data transmission system is provided. The data transmission system includes a controller and a plurality of nodes, and the controller includes the path planning apparatus according to the second aspect or the third aspect.

DESCRIPTION OF EMBODIMENTS

To make the objectives, technical solutions, and advantages of this application clearer, the following further describes implementations of this application in detail with reference to the accompanying drawings.

Figure 1:
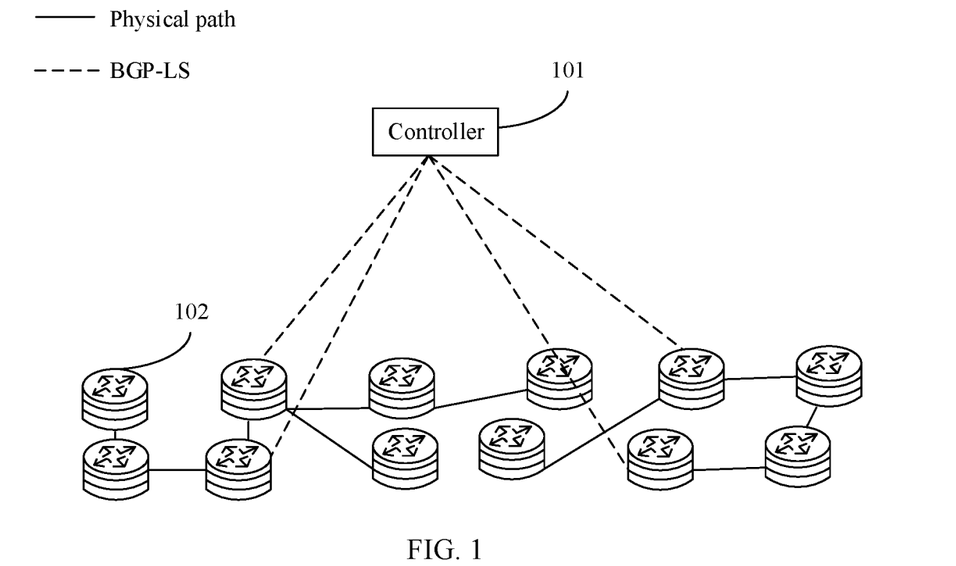
FIG. 1 is a schematic diagram of a structure of a data transmission system according to an embodiment of this application.

An embodiment of this application provides a data transmission system. As shown in FIG. 1, the data transmission system may include a controller 101 and a plurality of nodes 102. Further, the data transmission system may include a transmit end (not shown in FIG. 1) and a receive end (not shown in FIG. 1). It should be noted that a quantity of nodes 102, a quantity of transmit ends, and a quantity of receive ends are not limited in this embodiment of this application. In FIG. 1, the data transmission system includes 12 nodes 102.

For example, the controller 101 may be referred to as a network cloud engine internet protocol (NCE-IP) controller, and the controller 101 may be a server or a server cluster including a plurality of servers. The node 102 may be referred to as a forwarding node, a forwarding device, or the like, and the node 102 may be a device configured to forward data, such as a switch or a router. Both the transmit end and the receive end may be terminals such as mobile phones or computers. A physical path exists between the plurality of nodes 102. For example, a physical path may exist between some nodes in the plurality of nodes, and no physical path exists between some nodes in the plurality of nodes. The controller 101 may establish a communication connection to at least a part of the plurality of nodes 102 (where in FIG. 1, an example in which the controller establishes a communication connection to a part of nodes is used). The communication connection may be referred to as a border gateway protocol link state (BGP-LS) connection.

In the data transmission system, the controller 101 may plan a path between the plurality of nodes 102. Then, after data sent by the transmit end is received, the plurality of nodes 102 may transmit the data to the receive end based on the path preplanned by the controller 101.

For example, both the controller 101 and the node 102 may be devices that use the SRv6 technology. In a related technology, when the controller 101 plans a path for two specific nodes in the plurality of nodes 102 (where one node is referred to as a head node, and the other node is referred to as a tail node), the controller 101 may first determine a plurality of physical paths between the head node and the tail node. Then, the controller 101 needs to calculate a path with smallest costs in the plurality of physical paths based on a service level agreement (SLA) constraint, and compress the path with reference to an interior gateway protocol (IGP) route to reduce a quantity of nodes on the path. Finally, the controller may deliver information (such as a label and a sequence) about each node on the compressed path to the head node. In a subsequent process, if the head node receives to-be-forwarded data sent by the transmit end, the head node encapsulates the to-be-forwarded data into a data packet based on the information about each node on the path that is previously delivered by the controller, and forwards the data packet based on an SRH in the data packet. The data packet includes the SRH carrying the information about the node on the forwarding path, and a payload part carrying the to-be-forwarded data.

However, there are few alternative manners of planning a path by the controller. Embodiments of this application provide a brand new path planning solution which can enrich path planning manners.

Figure 2:
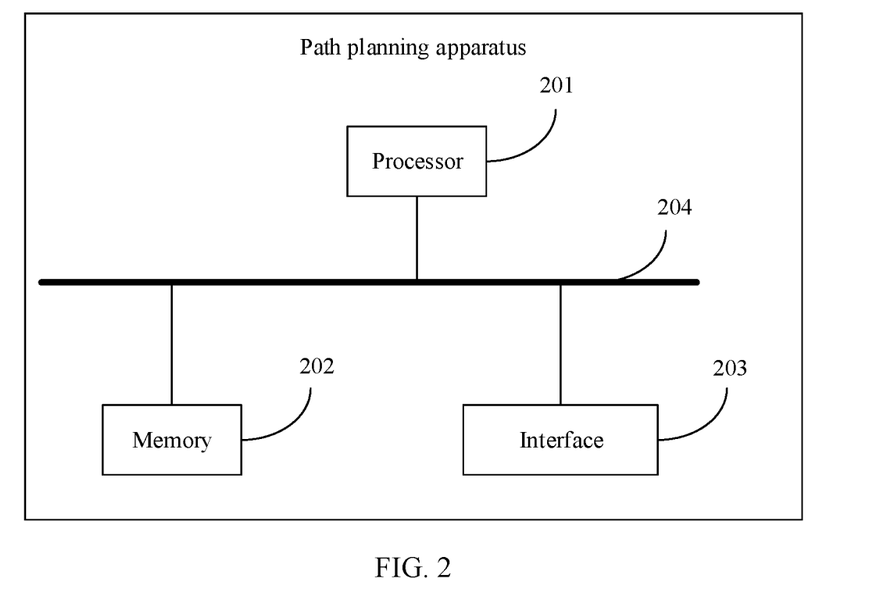
FIG. 2 is a schematic diagram of a structure of a path planning apparatus according to an embodiment of this application.

A path planning method provided in the embodiments of this application may be applied to a path planning apparatus (where the path planning apparatus may be used in the foregoing controller). For example, FIG. 2 is a schematic diagram of a structure of a path planning apparatus according to an embodiment of this application. As shown in FIG. 2, the path planning apparatus may include a memory 202 and a processor 201. The memory 202 stores a program, and the processor 201 is configured to execute the program stored in the memory 202 to implement the path planning method and/or operations performed by a controller, for example, the controller 101, provided in the embodiments of this application. A and/or B may represent A and B, or may represent A or B. Optionally, the path planning apparatus may further include at least one interface 203 (where one interface is shown in FIG. 2) and at least one communication bus 204 (where one communication bus is shown in FIG. 2). The interface 203 is configured to communicate with another storage apparatus or a network apparatus. The memory 202 and the interface 203 are separately connected to the processor 201 by using the communication bus 204.

Figure 3:
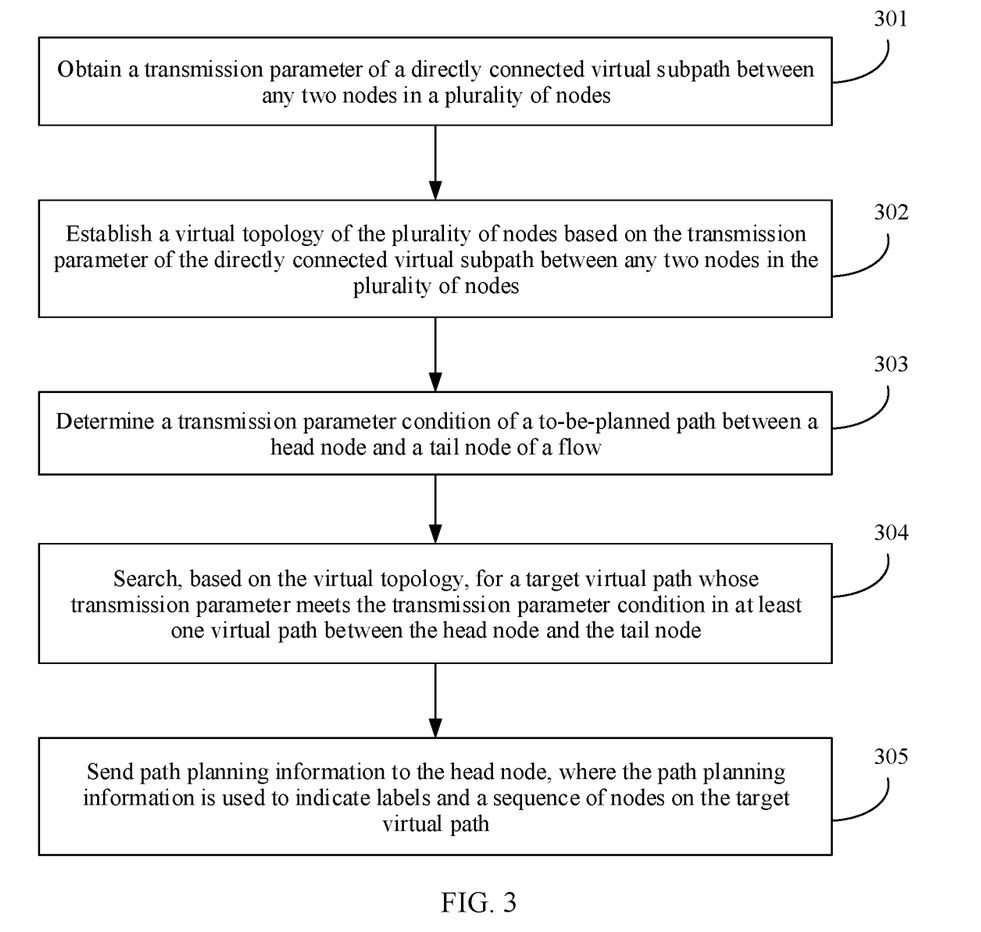
FIG. 3 is a flowchart of a path planning method according to an embodiment of this application.

For example, FIG. 3 is a flowchart of a path planning method according to an embodiment of this application. The path planning method may be applied to the controller 101 in the data transmission system shown in FIG. 1. As shown in FIG. 3, the path planning method includes the following operations:

Operation 301: Obtain a transmission parameter of a directly connected virtual subpath between any two nodes in a plurality of nodes.

For example, the plurality of nodes in operation 301 may be the plurality of nodes 102 in the data transmission system shown in FIG. 1. In operation 301, the controller needs to determine the directly connected virtual subpath between any two nodes in the plurality of nodes. It should be noted that the directly connected virtual subpath is not a real path, but a path virtualized by the controller, and a directly connected virtual subpath between two nodes does not include another node other than the two nodes.

Figure 4:
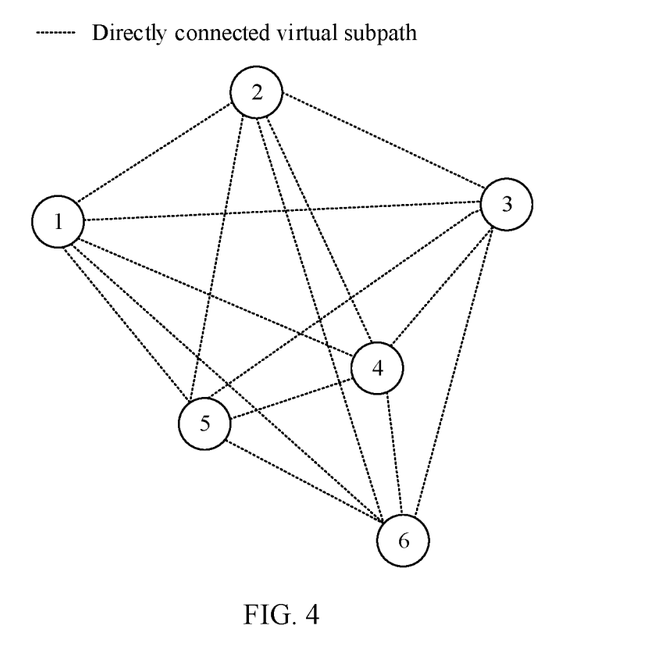
FIG. 4 is a schematic diagram of a virtual subpath according to an embodiment of this application.

For example, as shown in FIG. 4, assuming that the plurality of nodes include node 1, node 2, node 3, node 4, node 5, and node 6, in operation 301, the controller needs to determine: a directly connected virtual subpath between node 1 and node 2, a directly connected virtual subpath between node 1 and node 3, a directly connected virtual subpath between node 1 and node 4, a directly connected virtual subpath between node 1 and node 5, a directly connected virtual subpath between node 1 and node 6, a directly connected virtual subpath between node 2 and node 3, a directly connected virtual subpath between node 2 and node 4, a directly connected virtual subpath between node 2 and node 5, a directly connected virtual subpath between node 2 and node 6, a directly connected virtual subpath between node 3 and node 4, a directly connected virtual subpath between node 3 and node 5, a directly connected virtual subpath between node 3 and node 6, a directly connected virtual subpath between node 4 and node 5, a directly connected virtual subpath between node 4 and node 6, and a directly connected virtual subpath between node 5 and node 6.

In this embodiment of this application, an example in which the controller needs to determine the directly connected virtual subpath between any two nodes in the plurality of nodes is used. Optionally, the controller may determine only a directly connected virtual subpath between some nodes in the plurality of nodes. This is not limited in this embodiment of this application.

After determining the directly connected virtual subpath between every two nodes in the plurality of nodes, the controller needs to further determine a transmission parameter of each directly connected virtual subpath. For example, for the directly connected virtual subpath between every two nodes, the directly connected virtual subpath corresponds to a physical subpath. Correspondingly, the transmission parameter of the directly connected virtual subpath may be a transmission parameter of the physical subpath corresponding to the directly connected virtual subpath. When determining the transmission parameter of the directly connected virtual subpath, the controller needs to first determine an IGP physical subpath between two nodes directly connected through the directly connected virtual subpath. Then, a transmission parameter of the IGP physical subpath is determined as the transmission parameter of the directly connected virtual subpath. It should be noted that the physical subpath is the IGP physical subpath between the two nodes directly connected through the directly connected virtual subpath. For example, any one of the two nodes is used as a head node. If a data packet starts from the head node, the data packet may reach the other one of the two nodes by using a unique physical path according to the IGP. The physical path may be referred to as an IGP physical subpath between the two nodes.

Figure 5:
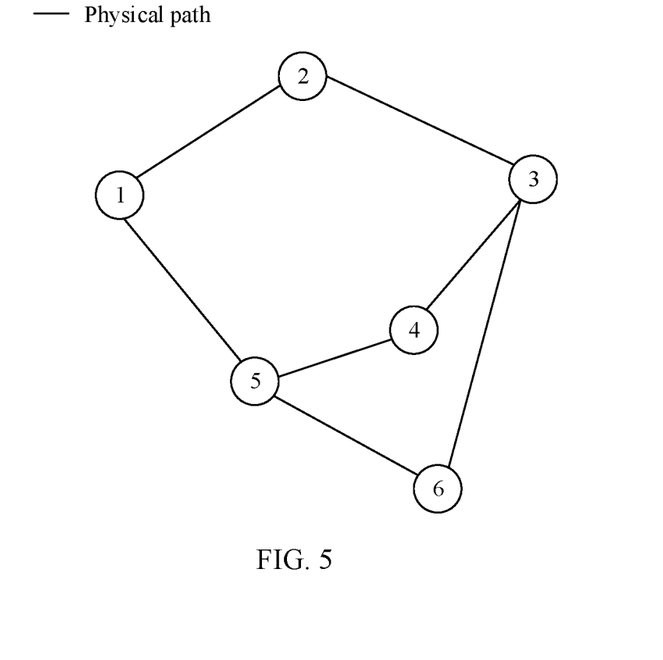
FIG. 5 is a schematic diagram of a physical subpath according to an embodiment of this application.

For example, assuming that physical paths that actually exist between the six nodes in FIG. 4 are shown in FIG. 5, it can be learned that a physical subpath exists between node 1 and node 2, a physical subpath exists between node 2 and node 3, a physical subpath exists between node 1 and node 5, a physical subpath exists between node 5 and node 4, a physical subpath exists between node 4 and node 3, a physical subpath exists between node 5 and node 6, and a physical subpath exists between node 6 and node 4. When the controller determines a transmission parameter of the virtual subpath between node 1 and node 3, if an IGP physical subpath between node 1 and node 3 is a physical subpath 1 (node 1-node 2-node 3), the controller may determine a transmission parameter of the physical subpath 1 as the transmission parameter of the virtual subpath between node 1 and node 3.

Further, the transmission parameter may be an SLA parameter, for example, a delay or a packet loss rate. In this embodiment of this application, the delay is used as an example. A physical subpath may be formed by connecting at least one directly connected physical path, and a delay of the physical subpath may be a sum of a delay of the at least one directly connected physical path. For example, the physical subpath 1 (node 1-node 2-node 3) includes: a directly connected physical path 1.1 (node 1-node 2) and a directly connected physical path 1.2 (node 2-node 3). If a delay of the directly connected physical path 1.1 is 0.1 seconds, and a delay of the directly connected physical path 1.2 is 0.2 seconds, a delay of the physical subpath 1 is 0.1 seconds+0.2 seconds=0.3 seconds.

Operation 302: Establish a virtual topology of the plurality of nodes based on the transmission parameter of the directly connected virtual subpath between any two nodes in the plurality of nodes.

The virtual topology includes the plurality of nodes, the directly connected virtual subpath between any two nodes in the plurality of nodes, and the transmission parameter of the directly connected virtual subpath. For example, the virtual topology may be a topology obtained by marking a transmission parameter on each directly connected virtual subpath in FIG. 4.

Operation 303: Determine a transmission parameter condition of a to-be-planned path between a head node and a tail node of a flow.

The controller usually needs to plan a forwarding path for at least one flow (at least one data flow), and each flow may correspond to one head node and one tail node. The flow in operation 303 may be any flow for which the controller needs to plan a path. In addition, each flow has a specific requirement on a transmission parameter, for example, requires a delay of less than 3 seconds. In operation 303, the controller needs to determine the transmission parameter condition of the to-be-planned path between the head node and the tail node of the flow (which is equivalent to a requirement of the flow on a transmission parameter).

Operation 304: Search, based on the virtual topology, for a target virtual path whose transmission parameter meets the transmission parameter condition in at least one virtual path between the head node and the tail node.

After obtaining the virtual topology and the transmission parameter condition of the to-be-planned path between the head node and the tail node, the controller may first determine the at least one virtual path between the head node and the tail node based on the virtual topology. It should be noted that the virtual path may be determined based on the directly connected virtual subpath in operation 301, and the virtual path includes at least one directly connected virtual subpath.

For example, when the head node is node 1 in FIG. 4, and the tail node is node 3 in FIG. 4, at least one virtual path between node 1 and node 3 includes a virtual path 1 (node 1-node 3), a virtual path 2 (node 1-node 2-node 3), and a virtual path 3 (node 1-node 4-node 3). The at least one virtual path between node 1 and node 3 may further include another virtual path, which is not listed one by one in this embodiment of this application. The virtual path 1 includes one directly connected virtual subpath (the directly connected virtual subpath between node 1 and node 3). The virtual path 2 includes two directly connected virtual subpaths (the directly connected virtual subpath between node 1 and node 2 and the directly connected virtual subpath between node 2 and node 3). The virtual path 3 includes two directly connected virtual subpaths (the directly connected virtual subpath between node 1 and node 4 and the directly connected virtual subpath between node 4 and node 3).

After determining the at least one virtual path between the head node and the tail node, the controller needs to determine a transmission parameter of each virtual path. For example, when determining the transmission parameter of the virtual path, the controller may first determine a transmission parameter of each directly connected virtual subpath in the virtual path, and then determine the transmission parameter of the virtual path based on transmission parameters of all directly connected virtual subpaths in the virtual path.

Each node on the virtual path is located on a corresponding physical path. For example, the virtual path includes at least one directly connected virtual subpath, and the physical path corresponding to the virtual path includes at least one physical subpath. The at least one directly connected virtual subpath is in a one-to-one correspondence with the at least one physical subpath, and a physical subpath corresponding to each directly connected virtual subpath is an IGP physical subpath between two nodes directly connected through the directly connected virtual subpath. In this case, the transmission parameter of each virtual path may be considered as a transmission parameter of the physical path corresponding to the virtual path.

Further, the controller may search for the target virtual path whose transmission parameter meets the transmission parameter condition in the at least one virtual path between the head node and the tail node. For example, to accelerate a speed at which the controller finds the target virtual path, and ensure that the target virtual path that is searched for is a path with a smallest quantity of nodes in the at least one virtual path, the controller may sequentially detect, in ascending order of a quantity of nodes on the virtual path, whether a virtual path whose transmission parameter meets the transmission parameter condition exists in the at least one virtual path. For example, the controller may first sequentially detect whether a transmission parameter of a virtual path including i (i≥2) nodes meets the transmission parameter condition. If it is detected that a transmission parameter of a specific virtual path including i nodes meets the transmission parameter condition, the controller may directly determine the virtual path as the target virtual path. If transmission parameters of all virtual paths that include i nodes do not meet the transmission parameter condition, the controller needs to further detect whether a transmission parameter of a virtual path that includes i+1 nodes meets the transmission parameter condition, until the controller finds a virtual path whose transmission parameter meets the transmission parameter condition.

For example, the foregoing example in operation 304 continues to be used as an example. There are two nodes on the virtual path 1, and there are three nodes on both the virtual path 2 and the virtual path 3. The controller may first detect whether a transmission parameter of the virtual path 1 meets the transmission parameter condition, and if the transmission parameter of the virtual path 1 meets the transmission parameter condition, the controller directly determine the virtual path 1 as the target virtual path. If the transmission parameter of the virtual path 1 does not meet the transmission parameter condition, the controller may sequentially detect whether transmission parameters of the virtual path 2 and the virtual path 3 meet the transmission parameter condition. If the transmission parameter of the virtual path 2 meets the transmission parameter condition, the controller directly determines the virtual path 2 as the target virtual path. If the transmission parameter of the virtual path 3 meets the transmission parameter condition, the controller directly determines the virtual path 3 as the target virtual path. It should be noted that, when detecting whether the transmission parameters of the virtual path 2 and the virtual path 3 meet the transmission parameter condition, the controller may first detect whether the transmission parameter of the virtual path 2 meets the transmission parameter condition, and then detect whether the transmission parameter of the virtual path 3 meets the transmission parameter condition. Alternatively, the controller may first detect whether the transmission parameter of the virtual path 3 meets the transmission parameter condition, and then detect whether the transmission parameter of the virtual path 2 meets the transmission parameter condition. Alternatively, the controller may detect whether the transmission parameter of the virtual path 2 meets the transmission parameter condition and whether the transmission parameter of the virtual path 3 meets the transmission parameter condition at the same time. When the transmission parameter of the virtual path 2 and the transmission parameter of the virtual path 3 both meet the transmission parameter condition, the virtual path 2 or the virtual path 3 is determined as the target virtual path. This is not limited in this embodiment of this application.

It should be noted that, because a quantity of nodes on the virtual path is usually equal to a quantity of hops on the virtual path between a start node and an end node plus one, that the controller sequentially detects the at least one virtual path in ascending order of a quantity of nodes on the virtual path (where the quantity sequentially increases from 2) may be considered as that the controller sequentially detects the at least one virtual path in ascending order of a quantity of hops on the virtual path between the start node and the end node (where the quantity of hops sequentially increases from 1).

Operation 305: Send path planning information to the head node, where the path planning information is used to indicate labels and a sequence of nodes on the target virtual path.

After determining the target virtual path, the controller may send the path planning information to the head node based on the target virtual path. The path planning information is used to indicate the labels and the sequences of the nodes on the target virtual path. Optionally, the path planning information is further used to indicate an identifier of the target virtual path. For example, the controller may send the path planning information to the head node based on an SR standard (for example, the SRv6 standard).

When forwarding data, the head node detects whether a node located on the target virtual path exists in an adjacent node. If the node located on the target virtual path exists, the head node directly forwards the data to the node. If the node located on the target virtual path does not exist, the head node may determine, according to the IGP, an adjacent node to which the data needs to be forwarded, and then forward the data to the adjacent node. Each node that receives the data may forward the data with reference to a manner in which the head node forwards the data. Details are not described herein in this embodiment of this application. In addition, because the target virtual path is determined based on the IGP physical subpath, using the foregoing data forwarding manner can ensure that the data is forwarded along a physical path corresponding to the target virtual path.

For example, it is assumed that the target virtual path is node 1-node 4-node 3 in FIG. 4, where node 1 is the head node, and node 3 is the tail node. In this case, when forwarding data, node 1 may first encapsulate the data into a data packet, and an SRH in the data packet carries a label of node 1, a label of node 4, and a label of node 3 that are sequentially arranged. Then, node 1 may forward the data packet. In this case, because no node that is the same as node 4 exists in adjacent nodes (including node 5 and node 2) of node 1, node 1 may delete the label of node 1 in the SRH, and forwards the data packet to node 5 according to the IGP. After node 5 receives the data packet, because a node that is the same as node 4 exists in adjacent nodes (including node 4, node 6, and node 6) of node 5, node 5 may forward the data packet to node 4. After node 4 receives the data packet, because a node that is the same as node 3 exists in adjacent nodes (including node 5 and node 3) of node 4, node 4 may delete the label of node 4 in the SRH, and forward the data packet to node 3. In this way, the data packet is forwarded from node 1 to node 3 along the target virtual path (node 1-node 4-node 3).

It can be learned that in this application, the controller delivers the labels and the sequence of the nodes on the target virtual path to the head node to indicate the target virtual path to the head node. When forwarding data, the head node may carry only the labels of the nodes on the target virtual path in the SRH. In addition, forwarding the data based on the labels of the nodes on the target virtual path enables the data to be forwarded along the physical path corresponding to the target virtual path. It should be noted that a length of a data packet is usually about 1500 bytes, and a length of an SRH is about 128 bytes. Therefore, if the SRH is excessively long, load in the data packet is relatively short, and a load rate is relatively low. However, in this application, when a quantity of nodes on the target virtual path is less than a quantity of nodes on the physical path corresponding to the target virtual path, a quantity of labels of nodes that need to be carried in the SRH is relatively small. Therefore, the SRH is relatively short, a load proportion of the data packet in which the SRH is located is relatively large, and a load rate of the data packet is increased.

It should be noted that, in the path planning solution in the related technology, the controller first determines the plurality of physical paths between the head node and the tail node, calculates the path with the smallest costs in the plurality of physical paths based on the SLA constraint, and compresses the path with reference to the IGP route to reduce the quantity of nodes on the path. However, because the path with the smallest costs may not be a path that satisfies the SLA constraint and has the smallest quantity of nodes after compression, the quantity of nodes on the path with the smallest costs is still relatively large after compression, and a load rate of the data packet forwarded by the head node is still relatively low. However, in the method provided in this embodiment of this application, a virtual subpath between every two nodes in the pre-established virtual topology represents an IGP physical subpath between the two nodes. Then, the target virtual path determined by the controller based on the virtual topology has a smallest quantity of nodes, a length of the SRH in the data packet sent by the head node is relatively short, and the load rate of the data packet is relatively high. In addition, the physical path corresponding to the target virtual path (that is, a physical path through which the data packet is actually transmitted) can meet the transmission parameter condition (for example, meet the foregoing SLA constraint).

Optionally, the path planning method provided in this embodiment of this application may further support dynamic path adjustment. The following describes a dynamic adjustment process.

For example, after sending the path planning information to the head node, the controller may further detect whether a faulty directly connected virtual subpath exists in the target virtual path, where an IGP physical subpath corresponding to the faulty directly connected virtual subpath is faulty. The controller may detect whether the IGP physical subpath is faulty in any manner. This is not limited in this embodiment of this application. For example, when duration of data transmission on a specific IGP physical subpath is greater than a duration threshold, the controller may determine that the IGP physical subpath is faulty. Alternatively, when a packet loss rate on a specific IGP physical subpath is greater than a packet loss rate threshold, the controller may determine that the IGP physical subpath is faulty.

If the controller determines that the faulty directly connected virtual subpath exists in the target virtual path, the controller may search, in the at least one virtual path between the head node and the tail node, for an auxiliary virtual path whose transmission parameters meet the transmission parameter condition in a remaining virtual subpath other than a virtual subpath in which the faulty directly connected virtual subpath is located. In addition, for a manner of searching for the auxiliary virtual path by the controller, refer to the manner of searching for the target virtual path. Details are not described herein in this embodiment of this application. After finding the auxiliary virtual path, the controller may send path update information to the head node, where the path update information includes labels and a sequence of nodes on the auxiliary virtual path. In addition, the path update information is used to indicate the head node to update the previous path planning information by using the path update information. In this way, when subsequently forwarding data, the head node may carry the labels of the nodes on the auxiliary virtual path in an SRH, so that a data forwarding path can be changed, and the data is prevented from being transmitted on the faulty path.

In conclusion, this embodiment of this application provides a path planning method. In the path planning method, the controller may search, based on the transmission parameter condition, for the target virtual path whose transmission parameter meets the transmission parameter condition in the at least one virtual path between the head node and the tail node. Then, the controller sends the path planning information used to indicate the labels and the sequence of the nodes on the target virtual path to the head node. It can be learned that this embodiment of this application provides a brand new path planning method, thereby enriching path planning manners.

It should be noted that, in operation 304, that the virtual path is determined based on the directly connected virtual subpath is used as an example. Certainly, the virtual path may not be determined based on the directly connected virtual subpath. For example, the virtual path may include at least one virtual subpath, and all of the at least one virtual subpath may not be a directly connected virtual subpath, or a part of the at least one virtual subpath may be a directly connected virtual subpath and the other part of the at least one virtual subpath may not be a directly connected virtual subpath.

In operation 304, that the controller sequentially detects, in ascending order of a quantity of nodes on the virtual path, whether the virtual path whose transmission parameter meets the transmission parameter condition exists in the at least one virtual path is used as an example. Optionally, the controller may first find a part of virtual paths whose transmission parameters meet the transmission parameter condition in the at least one virtual path, and then determine a path with a smallest quantity of nodes on the part of virtual paths as the target virtual path. This is not limited in this embodiment of this application. For example, the transmission parameter is a delay, and the transmission parameter condition is that a delay is less than 30 seconds. It is assumed that the part of virtual paths in the at least one virtual path include a virtual path x (node 1-node 5-node 4-node 3) whose delay is 25 seconds and a virtual path y (node 1-node 2-node 3) whose delay is 28 seconds. In this case, the controller may determine the virtual path y with the smallest quantity of nodes in the part of virtual paths as the target virtual path.

In this embodiment of this application, that the controller obtains the transmission parameter of the directly connected virtual subpath in advance before path planning is used as an example. Certainly, the transmission parameter of the directly connected virtual subpath may also be obtained only during path planning. This is not limited in this embodiment of this application. In this case, the foregoing virtual topology does not need to be established.

In addition, in this embodiment of this application, that a physical subpath corresponding to each directly connected virtual subpath is an IGP physical subpath between two nodes directly connected through the directly connected virtual subpath is used as an example. In this case, a physical path corresponding to a virtual path including the directly connected virtual subpath consists of at least one IGP physical subpath. In this way, when the head node forwards data, a quantity of labels of nodes that are carried in an SRH in a data packet into which the data is encapsulated is the smallest, and the data packet can be forwarded along the physical path corresponding to the virtual path.

In the related technology, each time the controller plans a path, the controller needs to calculate a transmission parameter of a physical path, and then selects one physical path based on the transmission parameter condition. Therefore, a calculation amount is relatively large in each path planning process. However, in this embodiment of this application, the controller may pre-establish the virtual topology of the plurality of nodes. Subsequently, each time a path is planned between the head node and the tail node, the controller may search for the target virtual path based on the virtual topology. Therefore, that the transmission parameter of the physical subpath corresponding to the directly connected virtual subpath is calculated in each path planning process is avoided. In this way, a calculation amount in a path planning process is reduced, and path planning efficiency is improved.

There is another path planning method in the related technology. In the method, a staff specifies a path between the head node and the tail node for the controller, and then the controller sends path planning information to the head node based on the path. However, this solution has relatively high labor costs and usually cannot support dynamic path adjustment. In the path planning method provided in this embodiment of this application, the controller can automatically plan a path without involvement of a staff. Therefore, labor costs are reduced. In addition, this application can support dynamic path adjustment.

Figure 6:
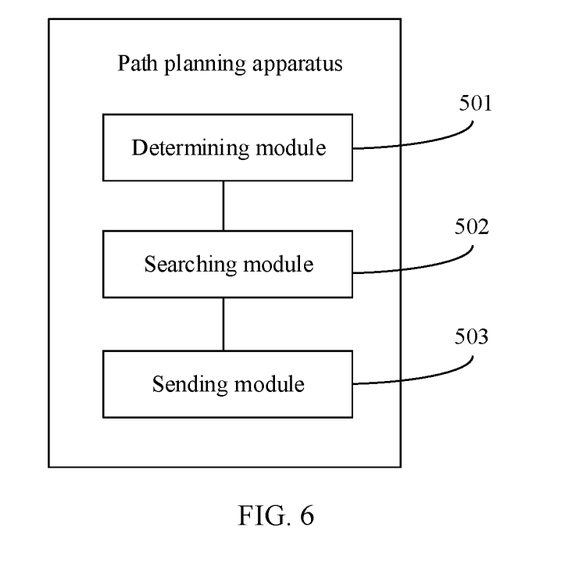
FIG. 6 is a schematic diagram of a structure of another path planning apparatus according to an embodiment of this application.

FIG. 6 is a schematic diagram of a structure of another path planning apparatus according to an embodiment of this application. As shown in FIG. 6, the path planning apparatus includes:

a determining module 501, configured to determine a transmission parameter condition of a to-be-planned path between a head node and a tail node of a flow;

a searching module 502, configured to search for a target virtual path whose transmission parameter meets the transmission parameter condition in at least one virtual path between the head node and the tail node, where a transmission parameter of the virtual path is a transmission parameter of a physical path corresponding to the virtual path, and each node on the virtual path is located on the corresponding physical path; and a sending module 503, configured to send path planning information to the head node, where the path planning information is used to indicate labels and a sequence of nodes on the target virtual path.

In conclusion, this embodiment of this application provides a path planning apparatus. In the path planning apparatus, the searching module may search, based on the transmission parameter condition, for the target virtual path whose transmission parameter meets the transmission parameter condition in the at least one virtual path between the head node and the tail node. Then, the sending module sends the path planning information used to indicate the labels and the sequence of the nodes on the target virtual path to the head node. It can be learned that the path planning apparatus provided in this embodiment of this application can perform a brand new path planning method, thereby enriching path planning manners.

Optionally, the target virtual path is a virtual path with a smallest quantity of nodes in a virtual path whose transmission parameter meets the transmission parameter condition in the at least one virtual path.

Optionally, the searching module is configured to:

sequentially detect, in ascending order of a quantity of nodes on the virtual path, whether a virtual path whose transmission parameter meets the transmission parameter condition exists in the at least one virtual path; and when that the virtual path whose transmission parameter meets the transmission parameter condition exists in the at least one virtual path is detected, determine the virtual path whose transmission parameter meets the transmission parameter condition as the target virtual path.

Optionally, the virtual path includes at least one directly connected virtual subpath, and the physical path corresponding to the virtual path includes at least one physical subpath, where the at least one directly connected virtual subpath is in a one-to-one correspondence with the at least one physical subpath, and a physical subpath corresponding to a directly connected virtual subpath is an interior gateway protocol IGP physical subpath between two nodes directly connected through the directly connected virtual subpath.

Optionally, the path planning apparatus further includes:

an obtaining module, configured to obtain a transmission parameter of a directly connected virtual subpath between any two nodes in a plurality of nodes, where the searching module is configured to:

determine a transmission parameter of each directly connected virtual subpath of the at least one virtual path based on the transmission parameter of the directly connected virtual subpath between any two nodes in the plurality of nodes;

determine a transmission parameter of each virtual path based on a transmission parameter of a directly connected virtual subpath of each virtual path in the at least one virtual path; and search for the target virtual path in the at least one virtual path based on a transmission parameter of the at least one virtual path.

Optionally, the path planning apparatus further includes:

an establishment module, configured to establish a virtual topology of the plurality of nodes based on the transmission parameter of the directly connected virtual subpath between any two nodes in the plurality of nodes, where the virtual topology includes the plurality of nodes, the directly connected virtual subpath between any two nodes in the plurality of nodes, and the transmission parameter of the directly connected virtual subpath, where the searching module is configured to:

determine the transmission parameter of each directly connected virtual subpath of the at least one virtual path based on the virtual topology.

Optionally, the path planning information is further used to indicate an identifier of the target virtual path.

Optionally, the transmission parameter includes a service level agreement SLA parameter.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk drive, or a magnetic tape), an optical medium, a semiconductor medium (for example, a solid-state drive), or the like.

It should be noted that mutual reference may be made to the method embodiment and the corresponding apparatus embodiments provided in the embodiments of this application. This is not limited in the embodiments of this application. A sequence of the operations of the method embodiment provided in the embodiments of this application can be properly adjusted, and the operations can be correspondingly added or deleted based on a situation. Any method that can be easily figured out by a person skilled in the art without departing from a technical scope disclosed in this application shall fall within the protection scope of this application, and therefore details are not described again.

In this application, "at least one" means one or more, and "a plurality of" means two or more. "At least one of the following" or a similar expression thereof means any combination of these items, including any combination of singular items or plural items. For example, at least one of a, b, or c may represent a, b, c, a+b, a+c, b+c, or a+b+c, where a, b, and c may be singular or plural. In this disclosure, the terms "first", "second", and the like are merely intended for description, and shall not be understood as an indication or implication of relative importance.

The foregoing descriptions are merely optional embodiments of this application, but are not intended to limit this application. Any modification, equivalent replacement, improvement, or the like made without departing from the spirit and principle of this application shall fall within the protection scope of this application.

What is claimed is:

1. A path planning method, wherein the method comprises:
    determining a transmission parameter condition of a to-be-planned path between a head node and a tail node of a flow;
    searching for a target virtual path whose transmission parameter meets the transmission parameter condition in at least one virtual path between the head node and the tail node, wherein a transmission parameter of the virtual path is a transmission parameter of a physical path corresponding to the virtual path, and each node on the virtual path is located on the corresponding physical path, wherein the at least one virtual path comprises a first directly connected virtual subpath, and wherein the searching for the target virtual path comprises:
        identifying a first interior gateway protocol (IGP) physical subpath corresponds to the first directly connected virtual subpath, wherein the first IGP physical path is a unique physical path according to IGP, and wherein the first IGP physical subpath comprises a first physical subpath and a second physical subpath; and
        determining a transmission parameter of the first directly connected virtual subpath by adding a first transmission parameter of the first physical subpath and a second transmission parameter of the second physical subpath; and
    sending path planning information to the head node, wherein the path planning information indicates labels and a sequence of nodes on the target virtual path.

2. The path planning method according to claim 1, wherein the target virtual path is a virtual path with a smallest quantity of nodes in a virtual path whose transmission parameter meets the transmission parameter condition in the at least one virtual path.

3. The path planning method according to claim 2, wherein the searching for a target virtual path whose transmission parameter meets the transmission parameter condition in at least one virtual path between the head node and the tail node comprises:
    sequentially detecting, in ascending order of a quantity of nodes on the virtual path, whether a virtual path whose transmission parameter meets the transmission parameter condition exists in the at least one virtual path; and
    when that the virtual path whose transmission parameter meets the transmission parameter condition exists in the at least one virtual path is detected, determining the virtual path whose transmission parameter meets the transmission parameter condition as the target virtual path.

4. The path planning method according to claim 1, wherein the virtual path comprises at least one directly connected virtual subpath, and the physical path corresponding to the virtual path comprises at least one physical subpath, wherein
    the at least one directly connected virtual subpath is in a one-to-one correspondence with the at least one physical subpath, and a physical subpath corresponding to a directly connected virtual subpath is an interior gateway protocol (IGP) physical subpath between two nodes directly connected through the directly connected virtual subpath.

5. The path planning method according to claim 4, wherein before the determining a transmission parameter condition of a to-be-planned path between a head node and a tail node of a flow, the path planning method further comprises:
    obtaining a transmission parameter of a directly connected virtual subpath between any two nodes in a plurality of nodes; and
    the searching for a target virtual path whose transmission parameter meets the transmission parameter condition in at least one virtual path between the head node and the tail node comprises:
    determining a transmission parameter of each directly connected virtual subpath of the at least one virtual path based on the transmission parameter of the directly connected virtual subpath between any two nodes in the plurality of nodes;
    determining a transmission parameter of each virtual path based on a transmission parameter of a directly connected virtual subpath of each virtual path in the at least one virtual path; and
    searching for the target virtual path in the at least one virtual path based on a transmission parameter of the at least one virtual path.

6. The path planning method according to claim 5, wherein after the obtaining a transmission parameter of a directly connected virtual subpath between any two nodes in a plurality of nodes, the method further comprises:
    establishing a virtual topology of the plurality of nodes based on the transmission parameter of the directly connected virtual subpath between any two nodes in the plurality of nodes, wherein the virtual topology comprises the plurality of nodes, the directly connected virtual subpath between any two nodes in the plurality of nodes, and the transmission parameter of the directly connected virtual subpath; and
    the determining a transmission parameter of each directly connected virtual subpath of the at least one virtual path based on the transmission parameter of the directly connected virtual subpath between any two nodes in the plurality of nodes comprises:

determining the transmission parameter of each directly connected virtual subpath of the at least one virtual path based on the virtual topology.

7. The path planning method according to claim 1, wherein the path planning information indicates an identifier of the target virtual path.

8. The path planning method according to claim 1, wherein the transmission parameter comprises a service level agreement (SLA) parameter.

9. A path planning apparatus, wherein the path planning apparatus comprises:
at least one processor;
one or more memories coupled to the at least one processor and storing instructions which when executed by the at least one processor, cause the path planning apparatus to:
determine a transmission parameter condition of a to-be-planned path between a head node and a tail node of a flow;
search for a target virtual path whose transmission parameter meets the transmission parameter condition in at least one virtual path between the head node and the tail node, wherein a transmission parameter of the virtual path is a transmission parameter of a physical path corresponding to the virtual path, and each node on the virtual path is located on the corresponding physical path, wherein the at least one virtual path comprises a first directly connected virtual subpath, and wherein the search for the target virtual path comprises:
identify a first interior gateway protocol (IGP) physical subpath corresponds to the first directly connected virtual subpath, wherein the first IGP physical path is a unique physical path according to IGP, and wherein the first IGP physical subpath comprises a first physical subpath and a second physical subpath; and
determine a transmission parameter of the first directly connected virtual subpath by adding a first transmission parameter of the first physical subpath and a second transmission parameter of the second physical subpath; and
send path planning information to the head node, wherein the path planning information indicates labels and a sequence of nodes on the target virtual path.

10. The path planning apparatus according to claim 9, wherein the target virtual path is a virtual path with a smallest quantity of nodes in a virtual path whose transmission parameter meets the transmission parameter condition in the at least one virtual path.

11. The path planning apparatus according to claim 9, wherein the instructions executed by the at least one processor to further cause the path planning apparatus to:
sequentially detect, in ascending order of a quantity of nodes on the virtual path, whether a virtual path whose transmission parameter meets the transmission parameter condition exists in the at least one virtual path; and
when that the virtual path whose transmission parameter meets the transmission parameter condition exists in the at least one virtual path is detected, determine the virtual path whose transmission parameter meets the transmission parameter condition as the target virtual path.

12. The path planning apparatus according to claim 9, wherein the virtual path comprises at least one directly connected virtual subpath, and the physical path corresponding to the virtual path comprises at least one physical subpath, wherein the at least one directly connected virtual subpath is in a one-to-one correspondence with the at least one physical subpath, and a physical subpath corresponding to a directly connected virtual subpath is an interior gateway protocol (IGP) physical subpath between two nodes directly connected through the directly connected virtual subpath.

13. The path planning apparatus according to claim 12, wherein the instructions executed by the at least one processor to further cause the path planning apparatus to:
obtain a transmission parameter of a directly connected virtual subpath between any two nodes in a plurality of nodes, wherein
determine a transmission parameter of each directly connected virtual subpath of the at least one virtual path based on the transmission parameter of the directly connected virtual subpath between any two nodes in the plurality of nodes;
determine a transmission parameter of each virtual path based on a transmission parameter of a directly connected virtual subpath of each virtual path in the at least one virtual path; and
search for the target virtual path in the at least one virtual path based on a transmission parameter of the at least one virtual path.

14. The path planning apparatus according to claim 13, wherein the instructions executed by the at least one processor to further cause the path planning apparatus to:
establish a virtual topology of the plurality of nodes based on the transmission parameter of the directly connected virtual subpath between any two nodes in the plurality of nodes, wherein the virtual topology comprises the plurality of nodes, the directly connected virtual subpath between any two nodes in the plurality of nodes, and the transmission parameter of the directly connected virtual subpath, wherein
determine the transmission parameter of each directly connected virtual subpath of the at least one virtual path based on the virtual topology.

15. The path planning apparatus according to claim 9, wherein the path planning information indicates an identifier of the target virtual path.

16. The path planning apparatus according to claim 9, wherein the transmission parameter comprises a service level agreement (SLA) parameter.

17. A non-transitory storage medium storing a program, which when executed by one or more processors, cause the one or more processors to perform operations, the operations comprising:
determining a transmission parameter condition of a to-be-planned path between a head node and a tail node of a flow;
searching for a target virtual path whose transmission parameter meets the transmission parameter condition in at least one virtual path between the head node and the tail node, wherein a transmission parameter of the virtual path is a transmission parameter of a physical path corresponding to the virtual path, and each node on the virtual path is located on the corresponding physical path, wherein the at least one virtual path comprises a first directly connected virtual subpath, and wherein the searching for the target virtual path comprises:
identifying a first interior gateway protocol (IGP) physical subpath corresponds to the first directly connected virtual subpath, wherein the first IGP physical path is a unique physical path according to IGP, and wherein the first IGP physical subpath comprises a first physical subpath and a second physical subpath; and determining a transmission parameter of the first directly connected virtual subpath by adding a first transmission parameter of the first physical subpath and a second transmission parameter of the second physical subpath; and sending path planning information to the head node, wherein the path planning information indicates labels and a sequence of nodes on the target virtual path.

18. The non-transitory storage medium according to claim 17, wherein the target virtual path is a virtual path with a smallest quantity of nodes in a virtual path whose transmission parameter meets the transmission parameter condition in the at least one virtual path.

19. The non-transitory storage medium according to claim 17, wherein the operations further comprise:

sequentially detecting, in ascending order of a quantity of nodes on the virtual path, whether a virtual path whose transmission parameter meets the transmission parameter condition exists in the at least one virtual path; and when that the virtual path whose transmission parameter meets the transmission parameter condition exists in the at least one virtual path is detected, determining the virtual path whose transmission parameter meets the transmission parameter condition as the target virtual path.

20. The non-transitory storage medium according to claim 17, wherein the virtual path comprises at least one directly connected virtual subpath, and the physical path corresponding to the virtual path comprises at least one physical subpath, wherein the at least one directly connected virtual subpath is in a one-to-one correspondence with the at least one physical subpath, and a physical subpath corresponding to a directly connected virtual subpath is an interior gateway protocol (IGP) physical subpath between two nodes directly connected through the directly connected virtual subpath.

* * * * *

UNITED STATES PATENT AND TRADEMARK OFFICE
CERTIFICATE OF CORRECTION

PATENT NO. : 12,250,144 B2
APPLICATION NO. : 17/741106
DATED : March 11, 2025
INVENTOR(S) : Mingliang Yin Page 1 of 1

It is certified that error appears in the above-identified patent and that said Letters Patent is hereby corrected as shown below:

On the Title Page

In Column 2 (Item (56) Other Publications), In Line 1, Delete "Appln" and insert -- Appln. --.

In Column 2 (Item (56) Other Publications), In Line 4, Delete "Appln" and insert -- Appln. --.

Signed and Sealed this
Twenty-second Day of July, 2025

Coke Morgan Stewart
*Acting Director of the United States Patent and Trademark Office*